(12) United States Patent
Cheng et al.

(10) Patent No.: US 7,424,363 B2
(45) Date of Patent: Sep. 9, 2008

(54) METHOD AND SYSTEM FOR ADAPTIVE NAVIGATION USING A DRIVER'S ROUTE KNOWLEDGE

(75) Inventors: Hua Cheng, Sunnyvale, CA (US); Lawrence Cavedon, San Francisco, CA (US); Robert Dale, Scotland Island (AU); Fuliang Weng, Mountain View, CA (US); Yao Meng, Sunnyvale, CA (US); Stanley Peters, Menlo Park, CA (US)

(73) Assignee: Robert Bosch Corporation, Broadview, IL (US)

( * ) Notice: Subject to any disclaimer, the term of this patent is extended or adjusted under 35 U.S.C. 154(b) by 765 days.

(21) Appl. No.: 10/923,590

(22) Filed: Aug. 20, 2004

(65) Prior Publication Data

US 2006/0041378 A1 Feb. 23, 2006

(51) Int. Cl.
*G01C 21/30* (2006.01)
(52) U.S. Cl. .................. 701/211; 701/200; 701/201; 701/214; 340/995.23
(58) Field of Classification Search .............. 701/200, 701/201, 208, 300, 211–214; 340/988, 995.17, 340/995.19, 995.23, 995.27
See application file for complete search history.

(56) References Cited

U.S. PATENT DOCUMENTS 6,333,702 B1 * 12/2001 Hiyokawa et al. ...... 340/995.21

OTHER PUBLICATIONS

International Search Report, Nov. 25, 2005, International Patent Application PCT/US2005/025807.
Written Opinion of The International Searching Authority for International Patent Application PCT/US2005/025807.
Rogers, S. Langley P. 1998 "Interactive Refinement Of Route Preferences For Driving" Interactive and Mixed -Initiative Decision-Theoretic Systems (TR SS-98-03) AAAI Press Menlo Park, CA, USA.
Takashi K. et al. 1995 "Drivers' Route Selection Based On Fuzzy-Neutral Approaches" 'Steps Forward'. Proceedings of the Second World Congress on Intelligent Transport Systems '95 Yokohama Vehicle, Road & Traffic Intelligence Soc Tokyo, Japan, vol. 4: 1854-1859.
Peeta, S. Yu, J.W. 2004 "Adaptability of a Hybrid Route Choice Model to Incorporating Driver Behavior Dynamics under Information Provision" IEEE Transactions on Systems, Man & Cybernetics, Part A (Systems & Humans) IEEE USA, 34 (2) 243-256.

* cited by examiner

*Primary Examiner*—Gertrude Arthur Jeangla
(74) *Attorney, Agent, or Firm*—Kenyon & Kenyon LLP

(57) ABSTRACT

A method and system are described to adapt instructions for performing a task by a user, which includes receiving generalized instructions for the task, selecting a content of the generalized instructions based on user-specific knowledge regarding the task, constructing utterances using the selected content, and conveying the utterances to the user.

24 Claims, 7 Drawing Sheets

| Situation | Dialogue |
|---|---|
| User driving from home | U1: How can I get to the Orbit Cafe in San Francisco? |
| | S1: Take Highway 101 and exit at Duboce Ave. It will take about 30 minutes to get there. |
| When approaching SF– | S2: You'll be taking the Duboce Ave. exit, so stay left. |
| When approaching the exit– | S3: The highway will end very soon and you will be on Duboce Ave. |
| System waits while user gets off the highway. | S4: Do you still remember how to get to Market St.? |
| | U2: Not really. |
| | S5: Follow this road, and turn right at Guerrero St. |
| | S6: Turn left here at Market St, and look for parking. |

Figure 1

FromStreet: Arastradero Road, 94304
IntoRoad: Foothill Expressway, 94304
TurnDirection: left
Familiarity: 2
LastVisit: 1/27/2004/15

Driving Distance: 5.8 mile(s).
Driving Time: 9 minute(s).
Depart. Go East on Miranda Ave.
Drive 0.2 mile(s), <1 minute.
Turn left on Arastradero Rd.
Drive 1.0 mile(s), 1 minute(s).
Straight on Hospital Dr.
Drive 0.1 mile(s), <1 minute.
Arrive.

300

Drive east on Miranda Ave.,
Stay in the left lane and turn onto Arastradero Road.
Turn right onto El Camino Real and drive for about 3.5 miles.
Turn right onto Grand Road.
Turn right onto North Dr., and it soon turns into Hospital Dr.

Get onto El Camino Real east and drive for about 3.5 miles.
Turn right onto Grand Road.
Turn right onto North Dr., and it soon turns into Hospital Dr.

METHOD AND SYSTEM FOR ADAPTIVE NAVIGATION USING A DRIVER'S ROUTE KNOWLEDGE

FIELD OF THE INVENTION

The present invention relates to a method and system for adapting navigation instructions using a driver's knowledge about roads and routes, for example, and/or information regarding an external situation.

BACKGROUND INFORMATION

As more devices find their way into the car to address people's desire for communication, entertainment and telematics services, a need may arise to ensure that these in-car devices can be operated without increasing the risk of traffic accidents. In this regard, if driving is considered a "eyes busy, hands busy" activity, then spoken language may be an appropriate choice for interaction between drivers and certain in-car devices. However, drivers may not be expected to learn and remember a complicated sets of spoken commands, and so rather than rely on a device-specific set of keywords, drivers may prefer to interact with in-car devices in a more flexible manner using natural language. Drivers may also prefer that their interaction with in-car devices be more personalized as well.

The in-car devices requiring interaction with the driver may include, for example, navigation systems. In the automotive industry, commercially available navigation systems may offer general-purpose turn-by-turn instructions, which may be helpful on certain occasions, but may be undesirable sometimes because they do not take into account a driver's knowledge, such as, for example, the driver's knowledge regarding certain roads or routes. The commercially available systems may also not take into account the external driving situation.

Existing route description generation systems may produce generic or at best navigation information that only accounts for limited driver specific characteristics. K. Höök, in her 1991 master's thesis entitled "An Approach to Route Guidance Interface" for the Department of Computer and Systems Sciences of Stockholm University, surveys the literature on driver modeling and concludes that an explicit user model is needed. However, K. Höök merely distinguishes users as tourist, resident and commuter navigators, in which routes are chunked and presented in different ways to these user groups. T. Pattabhiraman and N. Cercone in their paper entitled "Selection: Salience, relevance and the coupling between domain-level tasks and text planning", which appeared in the 1990 Proceedings of the 5$^{th}$ International Workshop on NLG held in Pennsylvania, discuss the importance of salience and relevance in the content selection stage of route description generation. However, the notion of relevance discussed therein is pertinent to the communicative goals of the generator rather than those of the user. L. Fraczak et al., in their paper entitled "Automatic generation of subway directions: Salience graduation as a factor for determining message and form", which appeared in the 1998 Proceedings of International Conference on Natural Language Generation, in Niagra-on-the-Lake, Canada, distinguish between known and unknown information, and discuss that the problem concerning the known information is to determine whether or not to make it explicit, but only deal with unknown information. Dale et al., in their paper entitled "Coral: Using natural language generation for navigational assistance", which appeared in the 2003 Proceedings of the 26$^{th}$ Australian Computer Science Conference in Adelaide, Australia, discuss a desire to produce natural route descriptions using general purpose generation techniques but only feature a generation architecture, which emphasizes the micro-planning level to reproduce human writing patterns. In particular, the system described by Dale et al. takes Geographic Information Service (GIS) data input, segments it into hierarchical structures, and then uses aggregation and referring expression generation techniques to merge the data into coherent multi-clausal sentences.

Zukerman and Albrecht in the section entitled "Predictive statistical models for user modeling" of the 2001 publication "User Modeling and User-Adaptive Interaction" discuss two main user modeling techniques to adapt the behavior of systems in the contexts of a user-specific web page recommendation, namely, content-based modeling and collaborative modeling. Content-based modeling assumes that users exhibit particular behaviors under given circumstances, and that this behavior is repeated under similar circumstances, which may be most useful when a user's past behavior is a reliable indicator of future behavior. Collaborative modeling assumes that people with related characteristics tend to behave similarly under the same circumstances, which may be most useful when a user's behavior is similar to that of other (like-minded) users.

Existing generation components of dialogue systems have previously used collaborative modeling to predict a user behavior based on those exhibited by the group the user belongs to. Zukerman and Litman, identify a number of user features often considered in the content planning module of existing natural language generation (NLG) systems, including expertise or interests, preferences, user prototypes, and emotional state.

Although data may be collected from a large number of people, variations between individuals may reduce the predictability of the collaborative approach. The content-based approach, by contrast, may be more accurate for modeling individual user behaviors, but it use may be limited by a lack of sufficient training data. Accordingly, the two approaches may be combined to achieve better predictions. For example, the collaborative modeling may be used for a new user when there is not enough evidence to support a reliable prediction, and as more evidence is collected, the system may switch to the content-based approach.

SUMMARY OF THE INVENTION

The present invention describes an exemplary method and system to adapt navigation instructions based on a driver's knowledge regarding, for example, roads, routes, points of interest (POIs) along the routes, etc. (referred herein collectively as "the driver's route knowledge"). In this regard, the driver's route knowledge may be represented, for example, by all the decision points (DPs) along the routes, in which the driver has traveled, together with the driver's familiarity with the decision points. Accordingly, the exemplary method may select navigation instructions to be presented to the driver based on the driver's familiarity with a decision point on a route. A model of the driver's route knowledge may be maintained and dynamically updated in an implicit manner by observing the driver's daily driving activities and responses to clarification questions, or in an explicit manner by directly querying the driver. The decision points may be hierarchically organized to handle the instances, for example, when there is a mismatch between the driver model and the driver's actual knowledge.

An exemplary embodiment and/or exemplary method according to the present invention may provide a natural language dialogue interface for operating in-car devices and services, which may impose a minimum cognitive load on the driver by understanding drivers' requests and producing responses based on the driver's knowledge, the conversational context, and/or the external situation. It is believed that an interactive, robust and situation aware dialogue may enhance usability and safety by reducing cognitive load in the driving situation. An exemplary system may allow the driver to operate in-car equipment and obtain navigation information (e.g., turn-by-turn instructions) or other information about local facilities.

An exemplary embodiment and/or exemplary method may provide a representation of the driver's route knowledge that is scaleable and allows fast dynamic updates. Prior approaches may use representations that log all intersections and roads that a driver has driven, which may explode in size, and also use information that is not necessarily salient to the driver to bias routes.

An exemplary embodiment and/or exemplary method may also provide a navigation content selection method makes decisions about navigation instruction presentation to the driver based on a model of the driver's route knowledge and/or the external situation, whereas prior approaches may make decisions based on generalized driver prototypes. In this regard, rather than overwhelming the user with known or redundant information, the user may be provided with only that information which is important or relevant to achieve that navigation task at hand. This may be useful, for example, for cognitively overloaded environments, such as driving a car. Additionally, during the course of building up the driver model, speaker recognition algorithms may be used to track down which routes belong to which driver so that cars with multiple drivers, such as, for example, rental cars, may also be accommodated.

Two decision processes may be particularly relevant in the driving domain, that is, the decisions of "what to say" and "when to say it". In regards to the decision of "what to say", an exemplary embodiment and/or exemplary method according to the present invention may generate instructions and related information required for the success of the navigation task at hand, while providing reaffirmation and necessary grounding, which is customized as appropriate for the current driver. In regards to the decision of "when to say it", an exemplary embodiment and/or exemplary method may generate appropriate navigation information at the appropriate time, being cognizant of the potentially stressful situations such as missed turns and driving situations requiring high attentiveness, so that, for example, output that is not immediately critical may be delayed. Accordingly, navigation instructions may be adaptively generated and/or tailored on the basis of characteristics of both the driver and the external situation.

An exemplary embodiment and/or exemplary method of the present invention may address the "what to say" decision, such as, for example, the selection of navigation information to be presented to the driver, using a model of the driver's route knowledge. Such a content selection process may be included, for example, as a component of a domain-independent natural language generation system, which may be provided, for example, as part of a dialogue system toolkit. The in-car domain may raise specific issues for generation, such as situation awareness, user adaptability, incremental generation, conversation resumption, and time sensitive generation.

An exemplary embodiment and/or exemplary method of the present invention may address the "when to say it" decision using a model of the user's cognitive load, which may be estimated from a variety of sources, including, for example, instrumentation (e.g. sensors) and human factors.

An exemplary embodiment and/or exemplary method of the present invention may improve the presentation of information to the user and enhance the perception of the dialog system's intelligence, and consequently may speed up the market acceptance of the technologies and improves products' competitiveness.

BRIEF DESCRIPTION OF THE FIGURES

FIG. 1 shows an exemplary dialogue exchange between a driver and an exemplary system according to the present invention.

FIG. 2 shows an exemplary decision point along a navigation route.

DETAILED DESCRIPTION

Content-based Modeling

Figure 3:
FIG. 3 shows an exemplary set of instructions issued from a web-based navigation service.

Since a navigation system in any given car may be used by the same driver for many times, there may be opportunity to collect a large amount of driver-specific data through both implicit observations and explicit interactions. For example, a GPS-based navigation system may maintain a history of all the places the driver has been to, and use this to generate hypotheses about the driver's route knowledge. Based on this knowledge, reasonable assumptions may be made about what the driver knows and predictions about what the driver needs to know. In this regard, evidence used to form the hypotheses may be gathered, for example, by implicit observation and explicit enquiry. In implicit observation, the driver's daily driving activities and use of clarification questions may provide useful information regarding the driver and what he may know. For example, if the driver has driven to a place without asking for help, it may be assumed that the driver is familiar with the route between the origin and destination. If the driver queries how to implement a specific navigation instruction, such as, for example, if the driver asks how to get to Highway 101, it may be assumed that the driver is not familiar with that route.

In explicit enquiry, a direct query may be used to determine if a driver has been to a particular place or not, and if so, whether the driver still needs help. For example, an exemplary dialog system according to the present invention might say to the driver: You should first drive to Highway 101. Do you know how to get there? Accordingly, based on the driver's reply, the exemplary system may update its representation of the driver's route knowledge.

Where there is a sufficient amount of driver data available, an exemplary system according to the present invention may learn from this data and adapt its responses on the basis of the learned driver model. Accordingly, the exemplary system may omit information that the driver is familiar with, since otherwise, presenting all information, including information that the driver already knows, may be a distraction and/or cause irritation.

According to an exemplary embodiment and/or exemplary method, both the content-based approach and the collaborative approach may be used. In this regard, the content-based modeling approach may be appropriate when a sufficient amount of user specific data has been accumulated, and the collaborative modeling approach may provide defaults when user specific data is not available.

Domain Specific User Knowledge for Dialogue

FIG. 1 shows an exemplary dialogue exchange 100 between a driver and an exemplary system according to the present invention, in which the exemplary system provides customized output to the driver based on the driver's knowledge. In particular, in response to the driver's request U1 for directions to a particular destination, the exemplary system adapts its responses or queries S1-S6 to the driver based on the driver's knowledge. Here, the driver's knowledge may include, for example, a familiarity and/or preference regarding the local routes. Accordingly, instructions provided by the exemplary system may be more tailored to the driver and/or the task at hand. For example, a description for a route from the driver's home to the freeway may be reduced to something like that in S1 in FIG. 1 if the exemplary system knows that this is a route already known to the driver. In this regard, the exemplary system may also refer to previous driving experiences, as in Take the freeway south; you'll take the same exit you took to get to Bob's house last week. Such adaptive instructions may be preferable to the turn-by-turn instructions provided by other navigation systems in use today.

Route Knowledge Representation

Generating personalized navigation instructions may require acquisition and representation of the driver's route knowledge. Representations that log all intersections and roads that a driver has driven may explode in size, and therefore may include and/or use information that is not necessarily salient to the driver (e.g. a crossroad or intersection in which the driver simply must pass through but no other action by the driver is required). For example, the Route-Compiler system described in "Personalization of the automotive information environment" by Rogers et al., which appears in the 1997 Proceedings of the Workshop on Machine Learning in the Real World: Methodological Aspects and Implications, held in Nashville, Tenn., represents the routes that a driver has driven as a graph, in which nodes represent intersections and arcs represent the routes between them. A context-free grammar is extracted from the graph to represent the driver's route knowledge at various levels of detail, which is used to bias a route planing procedure to favor familiar routes, with the goal of minimizing the probability of getting lost.

According to an exemplary embodiment and/or exemplary method, a route may be represented by all the decision points (DPs) along the route, including, for example, the intersections where the driver makes a turn, where a street name or its class changes, or where the route begins and ends (e.g., origin and destination). In this regard, streets and roads may be assigned a class of 1 to 6, for example, with 6 denoting interstates and freeways, 3 denoting expressways, and 2 being a default class for most city streets. Intersections where the driver simply drives straight through or where there is no name or class change are not included as decision points (DPs) so that only the salient features to a route may be considered when biasing future route descriptions with respect to familiarity, although this may not preclude using other features in the route descriptions themselves. Accordingly, the amount of route information to be stored may be reduced since intersections and road information between intersections, which are not decision points, may be disregarded.

FIG. 2 shows an exemplary decision point (DP) 200 describing that the driver should turn left from Arastradeo Road into Foothill Expressway, the driver has made this maneuver twice before, and the last time was on Jan. 27, 2004 at 3 pm. In this regard, the exemplary decision point (DP) 200 includes "features" to structure the information contained therein. In particular, the exemplary decision point (DP) 200 includes the features of a "FromStreet", "IntoStreet", "TurnDirection", "Familiarity", and "LastVisit", where FromStreet is the street from which the vehicle is to make a turn, IntoStreet is the street into which the vehicle should turn, TurnDirection is the direction the vehicle should turn, e.g., left, south, u-turn, Familiarity is a measure of how familiar the driver is with this intersection, based on the number of times the driver has driven through this intersection from and into the same road, making the same turn, and LastVisit is the last time that the driver was here.

The features FromStreet, IntoStreet, and TurnDirection uniquely identify the exemplary decision point (DP). Familiarity may be measured, for example, on a scale of 1 to 5, with 5 indicating high familiarity. This information may be used, for example, to determine whether a decision point (DP) should be presented to the driver. LastVisit may be used, for example, as follows: if the driver traveled through a destination (DP) a long time ago, it may be assumed that the driver will not remember it, however, if the driver traveled the decision point (DP) fairly recently, then this information may be used to remind the driver about this intersection or road by referring to the driver's previous experience.

The decision points (DPs) may be stored and maintained, for example, in a knowledge base through Protégé, which is a tool for constructing and maintaining knowledge resources (information regarding Protégémay be found, for example, in Musen et al., "ProtégéII: An environment for reusable problem-solving methods and domain ontologies" appearing the 1993 International Joint Conference on Artificial Intelligence" held in Savoie, France). For each routing task, all the decision points along the route may be examined. If a decision point (DP) is new, an entry may be created in the knowledge base with a Familiarity value of 1. If the decision point (DP) is already in the knowledge base, its Familiarity value is incremented. If the driver queries about the decision point (DP) or gives a negative answer to the system's query about the decision point (DP), its Familiarity value is decremented.

For a new driver, the exemplary system may have no knowledge of the driver's background. As the interactions between the driver and the system increase, more and more driver specific features may be captured to provide a more fine-tuned and dynamic user modeling.

Route Description Generation

FIG. 3 shows an exemplary set of instructions 300 issued from a web-based navigation service provided by Robert Bosch Corporation in response to a request for routing information. The exemplary set of instructions 300 is supplied, for example, as text strings. The first line of the exemplary set of instructions 300 indicates the total travel distance, the second line indicates the total travel time, and each subsequent line provides a turn-by-turn instruction.

The exemplary set of instructions 300 may be provided as input to an exemplary content selection method according to the present invention. Given this detailed input, the exemplary method may extract information, such as, for example, street names and turning directions from the strings, and represent the information as internal objects. The exemplary method may select which instructions to present to the driver based on its modeling of the driver's route knowledge, and may aggregate multiple instructions as appropriate. The driver's route knowledge base may also be updated as navigation information is presented.

Figure 4:
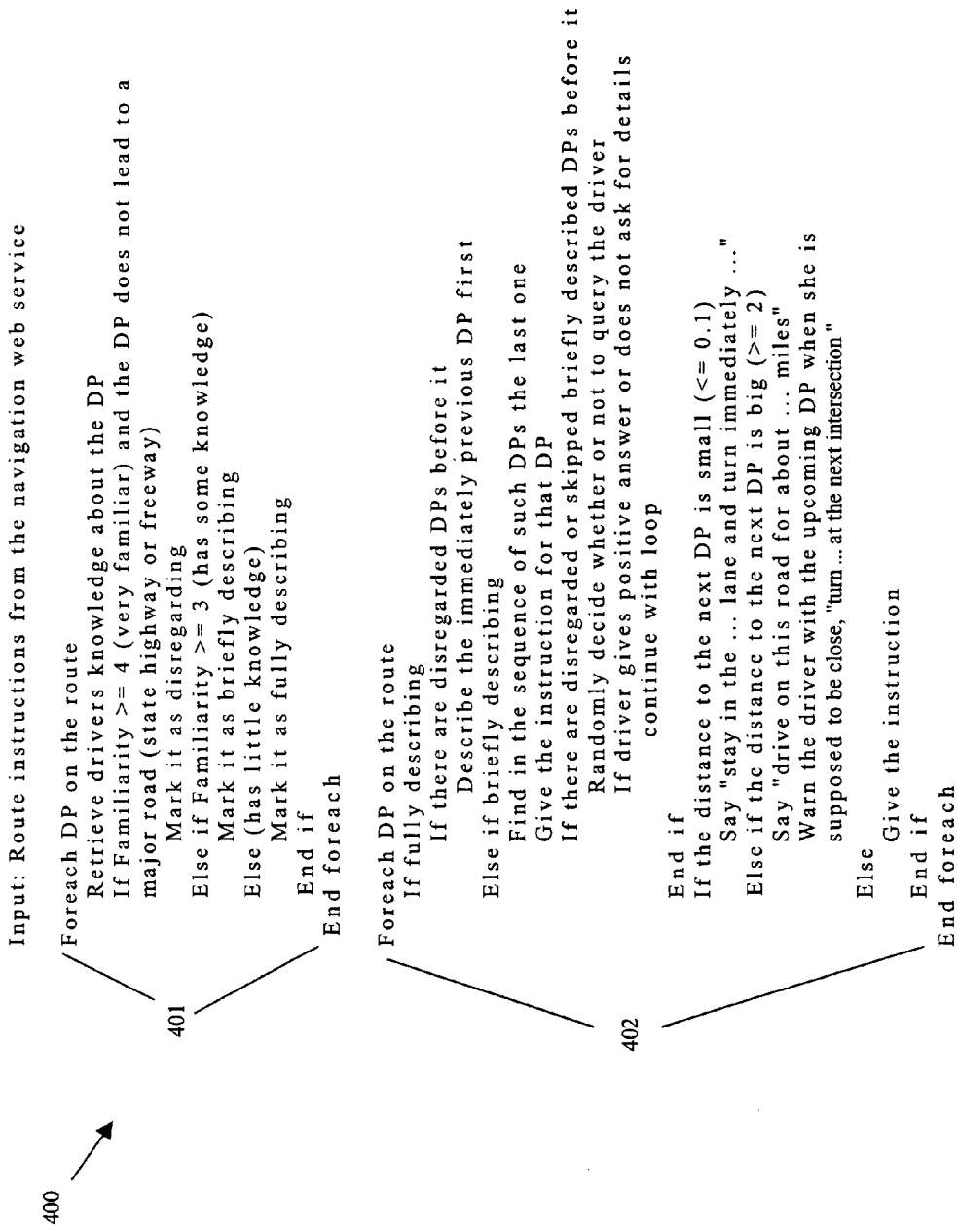
FIG. 4 shows an exemplary content selection method according to the present invention in pseudo code form.

FIG. 4 shows an exemplary content selection method 400, in exemplary pseudo code form, to select and present certain decision points (DPs) using route instructions provided, for example, by a web-based navigation service. The exemplary content selection method 400 includes a first loop 401 to determine how to present decision points (DPs) based on the driver's route knowledge, and a second loop 402 to present each decision point (DP) to the driver.

The exemplary content selection method 400 provides turn-by-turn instructions for a driver with little route knowledge, but for a local driver, it skips all familiar decision points (DPs) until encountering an unfamiliar or significant decision point (DP) (for example, a highway entrance). The exemplary content selection method 400 summarizes the route segments up to this decision point (DP), and provides detailed instructions from that point on. Here, a driver's route knowledge may include, for example, some local areas and several highways branching out from these areas. It is therefore expected that route knowledge acquired in this manner should consist of clusters of decision points in these local areas. These clusters plus the road classes may facilitate natural route. It will be appreciated that the exemplary content selection method 400 may be optimized based upon data collected, for example, from a simulated or actual driving environment, and that values used by the exemplary content selection method 400, such as, for example, the familiarity values of "3" and "4" to denote somewhat familiar and very familiar, may be updated accordingly.

The exemplary content selection method 400 performs aggregation based on the particular situation, using, for example, the distance between decision points. In particular, two instructions on decision points (DPs) whose distance is smaller than 0.1 miles are aggregated, as are adjacent instructions about the same decision point (DP).

The exemplary content selection method 400 may be implemented, for example, on any suitable processing arrangement, including, for example, a computer, together with a suitable interface, display and/or other input arrangement.

Sample Results

Figure 5A:
FIG. 5A shows exemplary instructions for a driver who has no knowledge of the requested route, which were generated using the exemplary set of instructions of FIG. 3 as input to the exemplary content selection method of FIG. 4.

FIG. 5A shows exemplary instructions 500A for a driver who has no knowledge of the requested route, which were generated using the exemplary set of instructions 300 of FIG. 3 as input to the exemplary content selection method 400 of FIG. 4. The exemplary instructions 500A include all required information and pertinent details of the exemplary set of instructions 300 without omission of content.

Figure 5B:
FIG. 5B shows exemplary instructions for a driver who has some knowledge of the requested route, which were generated using the exemplary set of instructions of FIG. 3 as input to the exemplary content selection method of FIG. 4.

FIG. 5B shows exemplary instructions 500B for a driver who has some knowledge of the requested route, which were generated using the exemplary set of instructions 300 of FIG. 3 as input to the exemplary content selection method 400 of FIG. 4. The exemplary set of instructions 500B include only that information which may be important or relevant to the driver and/or the navigation task at hand. In particular, FIG. 5B shows exemplary instructions 500B for a driver who knows how to get onto El Camino Real, which is a state highway, so in this instance, the exemplary system disregards instructions for the known sub-route.

Two types of aggregation are featured in the first and last utterances of the exemplary instructions 500. In particular, conjunction is used to combine descriptions of the same decision point (DP) or adjacent decision points (DPs) and subordinated prepositional phrases are used to realize distance information.

Architecture

Figure 6:
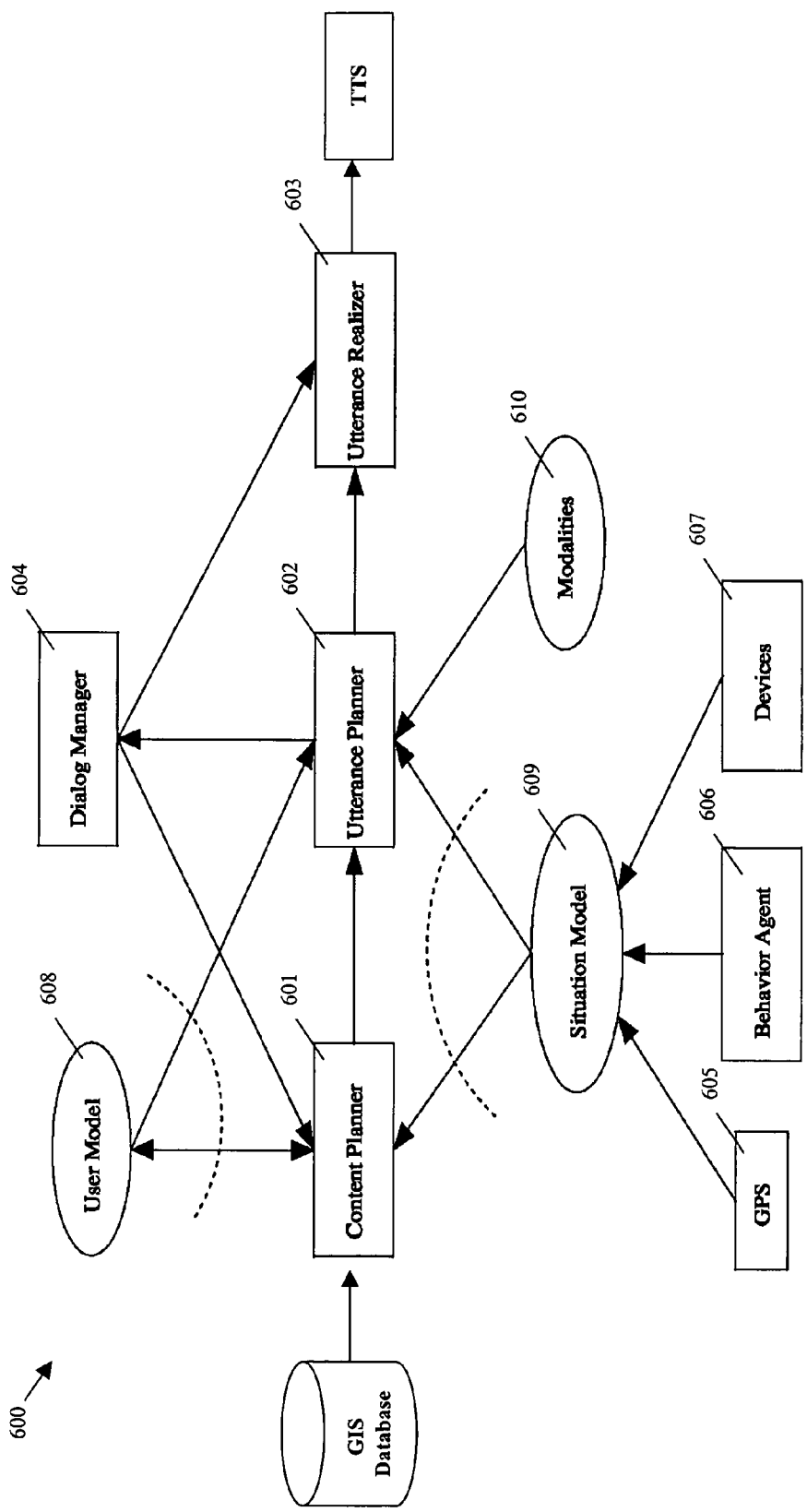
FIG. 6 shows an exemplary system architecture to provide natural language generation incorporating the exemplary content selection method of FIG. 4.

FIG. 6 shows an exemplary system architecture 600 to provide domain-independent natural language generation (NLG), which may be used in a vehicle-based environment to generate navigation instructions and/or adapt navigation instructions based on the external situation or knowledge that is specific to the user. In this regard, the exemplary system architecture 600 may produce conversational turns ranging from lengthy multi-clausal contributions to sub-clausal fragments, which are collectively referred to herein simply as "turns". Each turn may consist of several utterances, which should vary depending upon characteristics of the user.

The exemplary system architecture 600 includes a pipeline architecture with three major components: a content planner 601, an utterance planner 602 and an utterance realizer 603. The content planner 601 selects information to be expressed and organizes this information into a hierarchical structure, which represents a globally coherent text plan. The utterance planner 602 and utterance realizer 603 construct utterances that convey the selected information, and choose grammatical features to produce locally fluent utterances. The exemplary system architecture 600 also includes a dialog manager 604 to manage the dialog, as well as user and situations models 608 and 609, respectively, which may affect all levels of generation and have a bearing on the variety and complexity of the text being generated. In this regard, the situation model 609 may be created and maintained, for example, using input from a Global Positioning System (GPS) 605, a behavior agent 606, and other sensors and/or devices 607. Each component of the exemplary system architecture 600 is further described below.

The Content Planner

There may be different ways in which multi-utterance dialogue contributions might be generated. Research in text generation has addressed both top-down and bottom-up content planning strategies. In a dialogue context, this decision may be determined by the nature of the dialogue domains. Some domains are highly structured and goal-driven, and the generation system may be required to produce a text plan that conforms to the goal structure. In other domains, the goals are only loosely structured, as may be, for example, for an in-car navigation system, where a goal is to effectively navigate the driver to the destination. Different text plans may achieve the same goal, so a generation system should choose a text plan that satisfies as many domain and user preferences as possible.

The content planner 601 may be implemented, for example, in a generic manner to accommodate both needs, that is, to take either a communicative goal or a set of domain preferences as well as the semantic contents associated with these goals as the input, and produce a turn specification, which is a tree structure that contains the propositions to be expressed and the rhetorical relationships between them. The content planner 601 may be invoked once per conversational turn, and may make reference to a persistent dialogue model that is maintained over the entire dialogue. In this regard, the content planer 601 may use the exemplary content selection method 400 of FIG. 4 to adapt the dialogue based on a model of the driver's knowledge, which includes, for example, at least one exemplary decision point 200 of FIG. 2 to represent the route.

The Utterance Planner

The utterance planner 602 takes a turn specification and produces a sequence of one or more utterance specifications, compatible with the realizer input specification language. Two tasks of the utterance planner 602 include aggregation and referring expression generation. These two tasks encounter new challenges in the in-car dialogue environment due to the time-and position-sensitive nature of the generation task. A referring expression or aggregated utterance may cause confusion if the driver's position changes significantly during processing. Aggregation may also be used to provide additional information (such as landmarks) to help identify domain objects (e.g., "Turn left at Mathilda Avenue, where you can see an Arco gas station at the corner.").

The Utterance Realizer

The utterance realizer 603 takes an utterance specification and produces marked-up text, which may be supplied, for example, to a Text-To-Speech (TTS) generator. The utterance realizer 603 may have the ability to address the requirements of echoing user language, prosodic markup and variability.

The Dialogue Manager

The dialogue manager 604 stores the current context of the ongoing conversation, as well as the historical context. Each utterance, whether by the user or the system, is classified as a dialogue move, updating this context. In this regard, the dialogue manager 604 may construct an "Activity Tree", which represents all activities performed by the behavior agent 606 and their execution status. Other data structures may keep track of noun phrases (NPs), unresolved questions, etc.

The Behavior Agent

Requests from the user are communicated to the behavior agent 606 as goals for it to achieve. In this manner, the user may effectively converse with the behavior agent 606. In particular, the behavior agent 606 may execute the user's requests, and may also initiate new conversation topics (e.g., based on observations). Communicative goals from the behavior agent 606, whether in response or its own initiative, may be put on to the dialogue manager's Activity Tree, to become part of the content planning process. The behavioral agent 606 may prioritize its communicative goals according to urgency and importance, and hence ensure that critically important information is communicated early by the content planner 601.

The User and Situation Models

The user and situation models 608 and 609, respectively, are used to influence the content selection process and the generation of utterances, thereby accounting for a current situation and user-specific state. The user model 608 stores information pertinent to the current user, including, for example, the driver's route knowledge, which may be adapting over time, by observing the behavior of the user and/or explicitly querying for user preferences. The situation model 609 may draw upon multiple information sources, such as, for example, the GPS 605, device sensors 607, etc.

What is claimed is:

1. A method of adapting instructions for performing a task by a user, comprising:
receiving generalized instructions for the task;
selecting a content of the generalized instructions based on user-specific knowledge regarding the task;
constructing utterances using the selected content; and
conveying the utterances to the user.

2. The method of claim 1, further comprising:
modeling the user-specific knowledge as at least one feature of a decision point for the task.

3. The method of claim 2, wherein the at least one feature includes a familiarity value.

4. The method of claim 3, further comprising:
including the content of the generalized instructions related to the decision point in the selected content if the familiarity value exceeds a predefined value.

5. The method of claim 2, wherein the instructions include navigation instructions and the task includes navigating a route.

6. The method of claim 5, wherein the decision point includes a point along the route.

7. The method of claim 6, wherein the at least one feature includes a street from which the user is to make a turn, a street into which the user is to make the turn, a direction of the turn, a familiarity of the decision point by the user, and a time of last visit of the decision point by the user.

8. The method of claim 2, further comprising:
one of observing and interacting with the user to adjust the at least one feature.

9. The method of claim 1, further comprising:
selecting the content of the generalized instructions based on a current situation.

10. The method of claim 9, further comprising:
modeling the current situation with input from at least one of a GPS device and a sensor device.

11. A system to adapt instructions for performing a task by a user, comprising:
a user model to represent user-specific knowledge regarding the task;
a content planner to receive generalized instructions for the task and to select a content of the generalized instructions based on the user-specific knowledge;
an utterance planner to construct utterances for the selected content; and
an utterance realizer to convey the utterances to the user.

12. The system of claim 11, wherein the user-specific knowledge is modeled as at least one feature of a decision point of the task.

13. The system of claim 11, wherein the generalized instructions include navigation instructions and the task includes navigating a route.

14. The system of claim 11, further comprising:
a situation model to represent a current situation, wherein the content planner is configured to select the content of the generalized instructions based on the current situation.

15. The system of claim 11, further comprising:
a global positioning system to provide geographic information for adjusting the situation model.

16. The system of claim 11, further comprising:
a behavior agent to execute user requests, and to prioritize and communicate communicative goals to the content planner.

17. The system of claim 16, wherein the behavior agent is configured to initiate a conversation with the user.

18. The system of claim 11, further comprising:
a sensor device to sense conditions of the current situation.

19. The system of claim 11, further comprising:
a dialog manager to store a current context of the utterances conveyed to the user.

20. A storage medium having a computer program, which is executable by a processor arrangement, comprising:
- computer program code for performing the following:
  - receiving generalized instructions for a task;
  - selecting a content of the generalized instructions based on user-specific knowledge regarding the task;
  - constructing utterances using the selected content; and
  - conveying the utterances to the user.

21. The storage medium of claim 20, wherein the instructions include navigation instructions regarding a route, the task includes navigating the route, and the computer program code is further for performing the following:
- modeling the user-specific knowledge as at least one feature of a decision point for the task, the at least one feature including a street from which the user is to make a turn, a street into which the user is to make the turn, a direction of the turn, a familiarity of the decision point by the user, and a time of last visit of the decision point by the user.

22. A method of adapting instructions for performing a task by a user, comprising:
- receiving generalized instructions for the task;
- selecting a subset of the received instructions from the received instructions based on user-specific knowledge regarding the task;
- constructing utterances using the selected subset of instructions; and
- conveying the utterances to the user.

23. The method of claim 22, wherein:
- the task is to navigate along a route;
- the generalized instructions include instructions for multiple navigation maneuvers to be performed along the route in order to navigate along the route;
- the subset includes instructions for only some and not all of the multiple maneuvers; and
- the user-specific knowledge is knowledge regarding the multiple maneuvers.

24. A method for adapting route navigation instructions, which instruct how to follow a route, comprising:
- receiving the route navigation instructions;
- selecting an instructions subset from the route navigation instructions based on a user model of knowledge of a user about the route, the model generated based on a history of navigation associated with the user; and
- outputting information regarding navigation of the route based on the selected subset of instructions.

* * * * *